United States Patent
Pal et al.

(10) Patent No.: US 9,819,239 B2
(45) Date of Patent: Nov. 14, 2017

(54) END WINDING SUPPORT AND HEAT SINK FOR LIQUID-COOLED GENERATOR

(71) Applicant: Hamilton Sundstrand Corporation, Charlotte, NC (US)

(72) Inventors: Debabrata Pal, Hoffman Estates, IL (US); Joshua J. Krecklow, Leaf River, IL (US)

(73) Assignee: HAMILTON SUNDSTRAND CORPORATION, Charlotte, NC (US)

(*) Notice: Subject to any disclaimer, the term of this patent is extended or adjusted under 35 U.S.C. 154(b) by 264 days.

(21) Appl. No.: 14/706,338

(22) Filed: May 7, 2015

(65) Prior Publication Data

US 2016/0329765 A1    Nov. 10, 2016

(51) Int. Cl.

| | | |
|---|---|---|
| *H02K 3/18* | (2006.01) | |
| *H02K 3/52* | (2006.01) | |
| *H02K 9/19* | (2006.01) | |
| *H02K 3/24* | (2006.01) | |
| *H02K 5/20* | (2006.01) | |
| *H02K 9/22* | (2006.01) | |
| *H02K 3/38* | (2006.01) | |
| *H02K 3/50* | (2006.01) | |
| *H02K 3/51* | (2006.01) | |
| *H02K 7/00* | (2006.01) | |

(52) U.S. Cl.
CPC ............ *H02K 3/24* (2013.01); *H02K 3/38* (2013.01); *H02K 3/50* (2013.01); *H02K 3/51* (2013.01); *H02K 3/527* (2013.01); *H02K 5/20* (2013.01); *H02K 9/19* (2013.01); *H02K 9/22* (2013.01); *H02K 7/003* (2013.01)

(58) Field of Classification Search
CPC .. H02K 3/18; H02K 3/52; H02K 3/527; H02K 9/005; H02K 9/19; H02K 9/22; H02K 1/24

USPC ....... 310/54, 64, 65, 269, 216.074, 216.091, 310/270

See application file for complete search history.

(56) References Cited

U.S. PATENT DOCUMENTS

| | | | | |
|---|---|---|---|---|
| 3,032,665 | A | * | 5/1962 | Wilhelmson ........... H02K 9/005 310/54 |
| 4,360,750 | A | | 11/1982 | Pohl |
| 4,513,218 | A | | 4/1985 | Hansen |
| 4,943,746 | A | | 7/1990 | Scherzinger et al. |

(Continued)

FOREIGN PATENT DOCUMENTS

| | | |
|---|---|---|
| GB | 109294 A | 9/1917 |
| GB | 1396327 A | 6/1975 |
| JP | 04125041 A * | 4/1992 |

OTHER PUBLICATIONS

Translation of JP 04-125041, accessed Mar. 21, 2017, <https://www4.j-platpat.inpit.go.jp/cgi-bin/tran_web_cgi_ejje?u=http://www4.j-platpat.inpit.go.jp/eng/translation/20170322061903480208041472924629 63F738D6337A1066D3C47A1E80A1E45C7E>.*

(Continued)

*Primary Examiner* — Jeremy Luks

(74) *Attorney, Agent, or Firm* — Cantor Colburn LLP

(57) ABSTRACT

Embodiments of an end winding support and heat sink for a pole of a generator are provided. An aspect includes a flat plate portion, the flat plate portion comprising an internal cooling liquid channel that routes coolant through the flat plate portion. Another aspect includes a plurality of fins extending out from the flat plate portion, wherein wires of the windings of the generator are supported by the plurality of fins.

13 Claims, 4 Drawing Sheets

(56) References Cited

U.S. PATENT DOCUMENTS

| | | | |
|---|---|---|---|
| 5,347,188 | A | 9/1994 | Iseman et al. |
| 6,661,133 | B2 | 12/2003 | Liebermann |
| 7,476,993 | B2 | 1/2009 | Dooley et al. |
| 7,791,238 | B2 | 9/2010 | Pal et al. |
| 8,456,047 | B2 | 6/2013 | Pal et al. |
| 8,525,375 | B2 | 9/2013 | Pal |
| 8,729,751 | B2 | 5/2014 | Telakowski et al. |
| 8,829,744 | B2 | 9/2014 | Pal |
| 8,884,480 | B2 | 11/2014 | Pal et al. |
| 8,901,791 | B2 | 12/2014 | Saban et al. |
| 8,922,311 | B2 | 12/2014 | Pal et al. |
| 8,970,074 | B2 | 3/2015 | Wagner et al. |
| 2003/0193256 | A1 | 10/2003 | Liebermann |
| 2012/0112570 | A1* | 5/2012 | Le Besnerais ......... H02K 1/185 310/54 |
| 2013/0015729 | A1 | 1/2013 | Birdi et al. |
| 2013/0162071 | A1 | 6/2013 | Chamberlin et al. |
| 2013/0328424 | A1* | 12/2013 | Goto ....................... H02K 5/18 310/64 |
| 2014/0091650 | A1 | 4/2014 | Lenschow |
| 2015/0249370 | A1* | 9/2015 | Wirsch, Jr. ............... H02K 3/24 310/54 |

OTHER PUBLICATIONS

European Search Report for Application No. 16168734.8-1809; dated Oct. 5, 2016; 6 pgs.

* cited by examiner

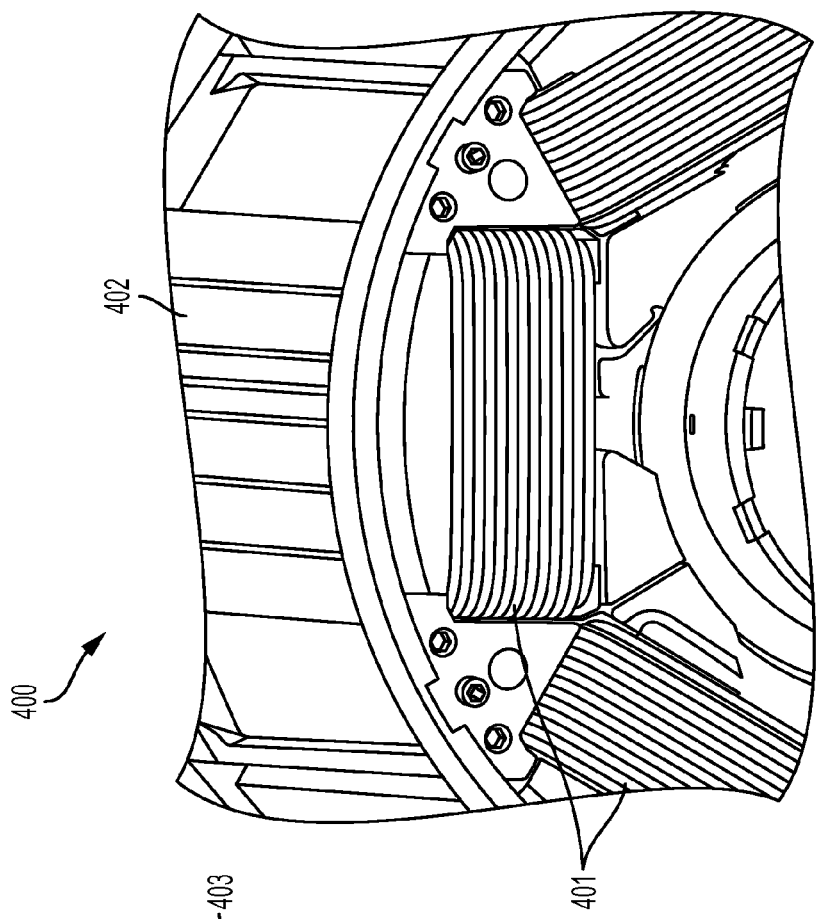
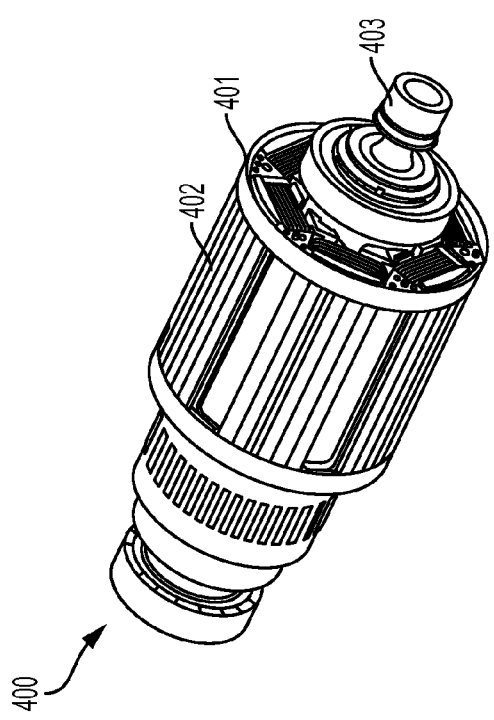
FIG. 4A
FIG. 4B

END WINDING SUPPORT AND HEAT SINK FOR LIQUID-COOLED GENERATOR

BACKGROUND

This disclosure relates generally to power generation systems, and more particularly to a combined end winding support and heat sink for a liquid-cooled generator.

Relatively high powered generators may be cooled during operation using a cooling liquid, rather than air cooling. Some liquid cooled generators may use rotating liquid sprayers, which may spray an oil-based liquid onto the rotor end windings and provide relatively effective cooling. However, due to the proximity of the sprayed cooling liquid to the rotating air gap of the generator, liquid from the spray in the air gap may cause increased friction and windage loss in the generator. This increased loss reduces generator efficiency and also results in increased rotor temperature.

SUMMARY

Embodiments of an end winding support and heat sink for a pole of a generator are provided. An aspect includes a flat plate portion, the flat plate portion comprising an internal cooling liquid channel that routes coolant through the flat plate portion. Another aspect includes a plurality of fins extending out from the flat plate portion, wherein wires of the windings of the generator are supported by the plurality of fins.

Embodiments of a rotor for a generator are also provided. An aspect includes a plurality of poles mounted on a rotor, each of the poles comprising a respective end winding support and heat sink, comprising a flat plate portion, the flat plate portion comprising an internal cooling liquid channel that routes coolant through the flat plate portion; and a plurality of fins extending out from the flat plate portion, wherein wires of the windings of the generator are supported by the plurality of fins.

Additional features are realized through the techniques of the present exemplary embodiment. Other embodiments are described in detail herein and are considered a part of what is claimed. For a better understanding of the features of the exemplary embodiment, refer to the description and to the drawings.

BRIEF DESCRIPTION OF THE SEVERAL VIEWS OF THE DRAWINGS

Referring now to the drawings wherein like elements are numbered alike in the several FIGURES:

FIGS. 4A-B illustrate windings on a generator pole.

DETAILED DESCRIPTION

Embodiments of an end winding support and heat sink, or heat exchanger, for a liquid-cooled generator are provided, with exemplary embodiments being discussed below in detail. The combined heat exchanger and end winding support are disposed at the ends of each rotor pole of the liquid-cooled generator. The end winding support includes a flat plate portion with internal cooling channels that conduct cooling liquid, and inlet and outlet tubes which direct coolant into and out of the flat plate portion. A plurality of fins extends off of the flat plate portion. The flat plate portion and fins may comprise any conductive material in various embodiments, including but not limited to a ceramic, aluminum, or copper material. The fins are shaped for holding and supporting the wires of the end windings. Each layer of wire winding may be supported by two adjacent fins. The wires of the end windings are separated from the fins and the flat plate portion by an insulator coating, which may comprise a ceramic insulator coating in some embodiments. Heat from the wire windings is conducted through the fins to the flat plate portion, and the heat in the flat plate is dissipated by the internal cooling channels. Embodiments of an end turn winding support and heat sink may be implemented in a generator comprising a four pole rotor. The coolant may be routed to and from the heat exchanger tubing in the flat plate portion of each pole by a hollow shaft that holds the inlet and outlet tubing.

Embodiments of an end winding support and heat sink may dissipate heat relatively efficiency, which may increase machine rotor insulation life and wedge fatigue life. Further, in some embodiments, the overall rotor may be made relatively compact, thereby reducing size and volume, and windage loss may be reduced, thereby increasing machine efficiency. Embodiments of an end winding support and heat sink for a liquid-cooled generator may be used for aerospace applications, for example, in an engine-mounted generator or an auxiliary power unit of an aircraft.

Figure 1:
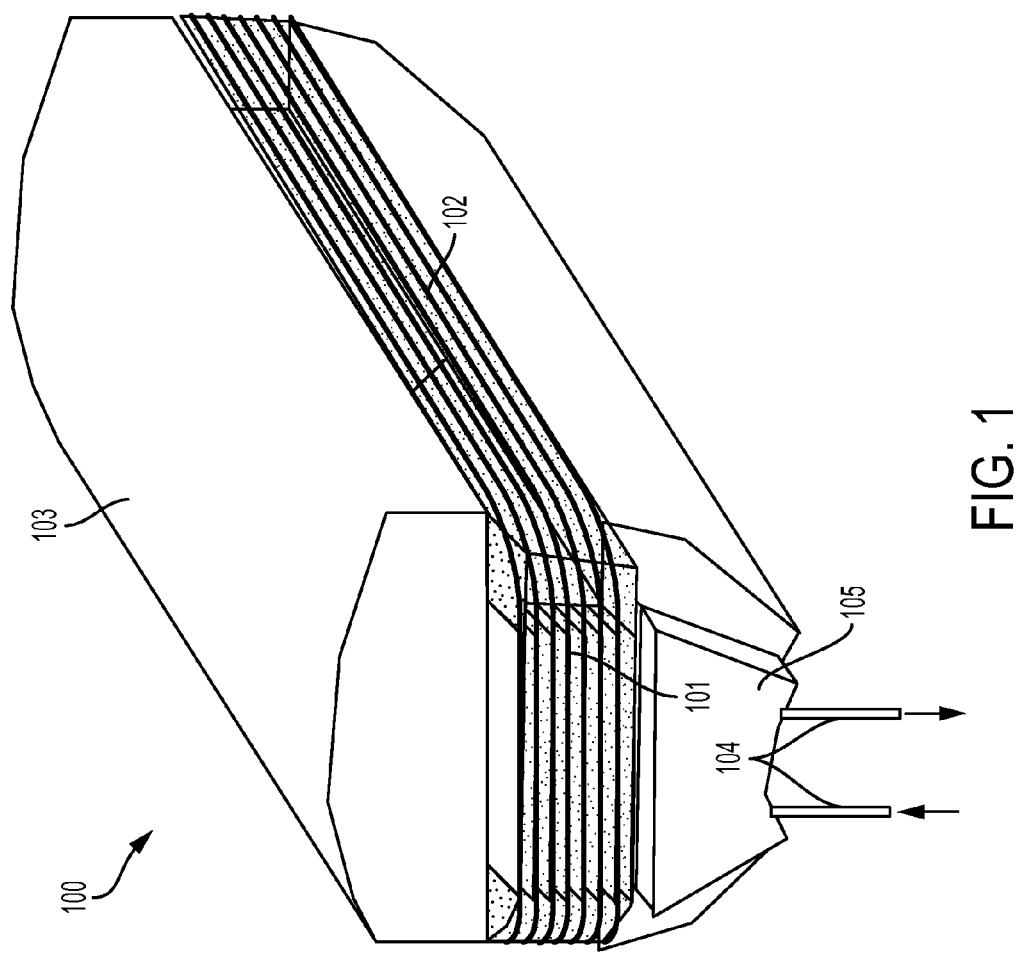
FIG. 1 illustrates an embodiment of a pole of a liquid-cooled generator with an end winding support and heat sink.

FIG. 1 illustrates an embodiment of a pole 100 of a liquid-cooled generator having an end winding support and heat sink. Pole 100 includes a core portion 103 that supports a plurality of copper windings 102 that are wrapped around fins that extend from a flat plate portion 105. Inlet and outlet tubing 104 conducts cooling liquid to and from the flat plate portion 105.

Figure 2B:
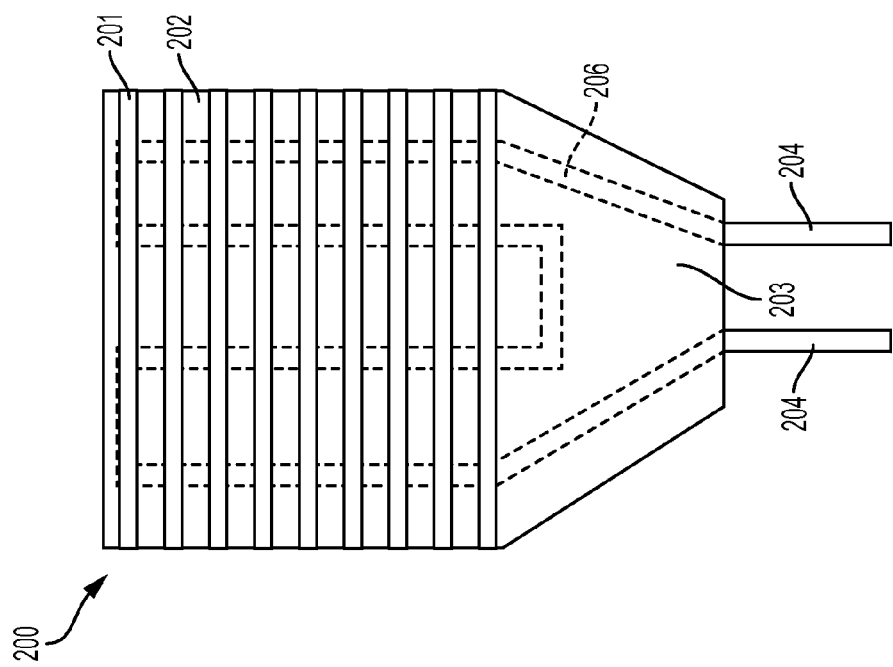
FIGS. 2A-B illustrate an embodiment of an end winding support and heat sink for a pole of a generator rotor.
Figure 2A:
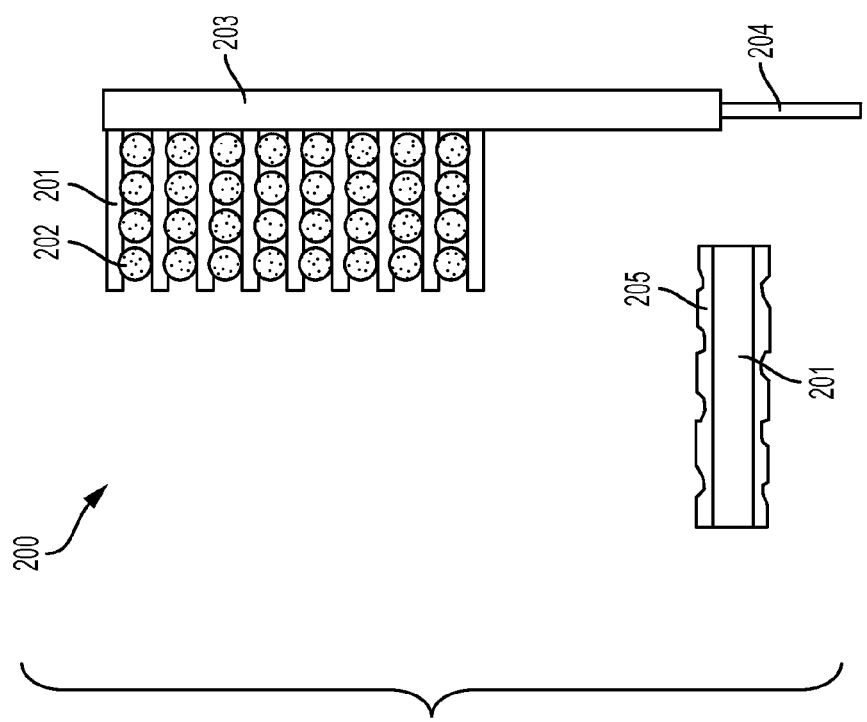

FIGS. 2A-B illustrate side and top views of an embodiment of an end winding support and heat sink 200 for a generator pole such as was shown in FIG. 1. End winding support and heat sink comprises a plurality of fins 201, which support windings 202. Windings 202 may comprise copper in some embodiments. The fins 201 may comprise any appropriate conductive material, such as ceramic, aluminum, or copper material, in various embodiments, and may further be covered by a layer of an insulator coating 205, as shown in the detailed view of fin 201 in FIG. 2A. The insulator coating 205 separates the windings 202 from the fins 201. The fins 201 conduct heat from the windings 202 into the flat plate portion 203 of the end winding support and heat sink 200. End winding support and heat sink 200 further includes tubing 204 that routes coolant to and from the flat plate portion 203 of the end winding support and heat sink 200. The coolant flows from tubing 204 through internal tubing 206 inside of the flat plate portion 203, as shown in FIG. 2B, in order to dissipate the heat that is conducted into the flat plate portion 203 from the fins 201 and thereby cool the windings 202. FIGS. 2A-B are shown for illustrative purposes only; an end winding support and heat sink may have any appropriate configuration of fins and windings on the flat plate portion, and the internal tubing within the flat plate portion may have any appropriate configuration.

Figure 3:
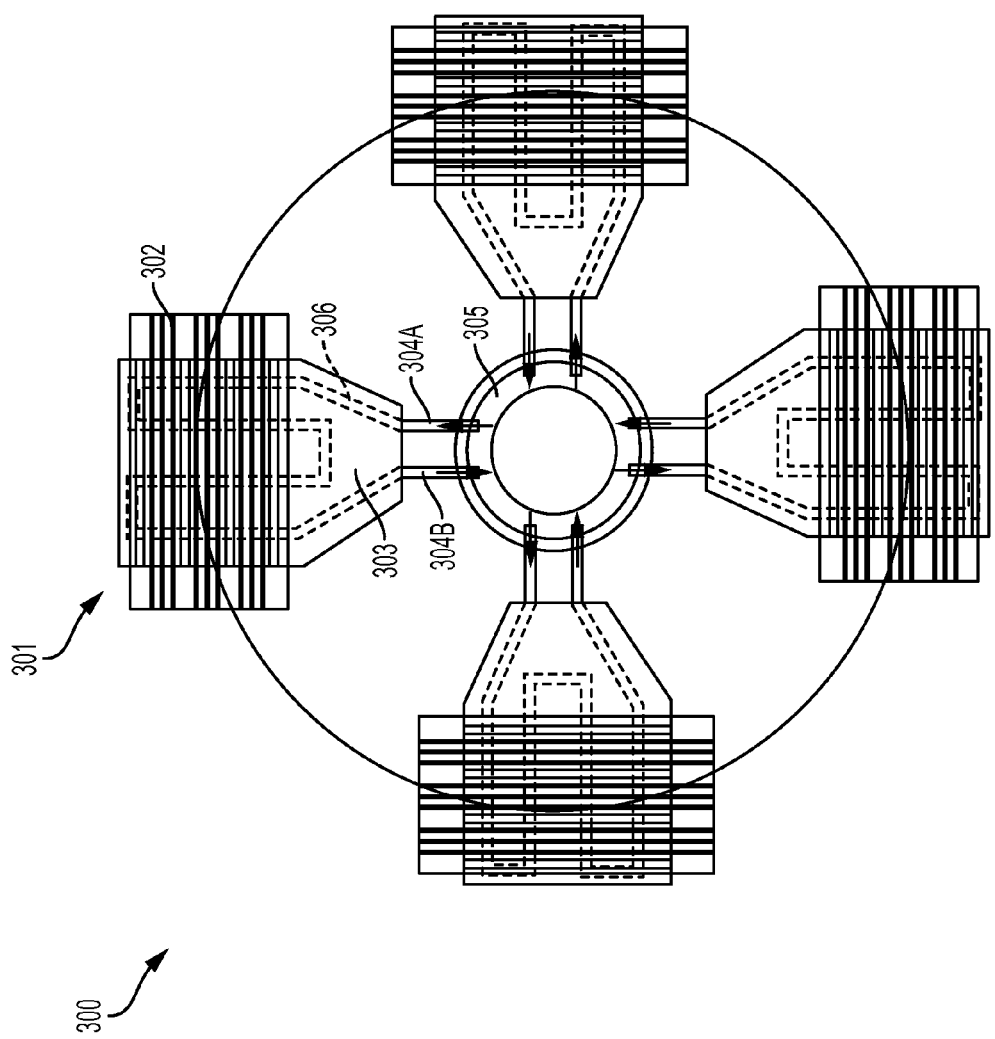
FIG. 3 illustrates an embodiment of a plurality of generator poles comprising end winding supports and heat sinks mounted on a generator rotor.

FIG. 3 illustrates an embodiment of poles comprising respective end winding supports and heat sinks mounted on a generator rotor 300. Generator rotor 300 includes a plurality of poles 301, each comprising windings 302 that are wound around fins that are mounted on a flat plate portion 303 (as was shown in FIGS. 2A-B). Coolant flows through each pole 301 from coolant inlet tubing 304A, through internal tubing 306, and out coolant outlet tubing 304B, to and from a coolant channel in the rotor hub at the center of generator rotor 300.

FIGS. 4A-B illustrate windings of a generator pole 400. Generator pole 400 includes core portion 402, windings 401 that are supported by an end winding support and heat sink, and a housing that holds coolant tubing that routes coolant into end winding support and heat sink that supports windings 401, such as coolant inlet tubing 304A and coolant outlet tubing 304B that were shown in FIG. 3.

The technical effects and benefits of exemplary embodiments include relatively efficient cooling of the windings of a pole of a generator rotor.

The terminology used herein is for the purpose of describing particular embodiments only and is not intended to be limiting of the invention. As used herein, the singular forms "a", "an", and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The invention claimed is:

1. A rotor pole of a liquid cooled generator, the rotor pole comprising:
a core portion that supports a plurality of layers of wire end windings;
an end winding support and heat sink disposed at each end of the core portion;
each end winding support and heat sink comprising:
a flat plate portion having a first flat surface and an opposing second flat surface, the first flat surface being a core facing flat surface and the second flat surface being an outwardly facing flat surface,
the flat plate portion comprising an internal cooling liquid channel that routes coolant into and out of the flat plate portion, the cooling liquid channel disposed between the first flat surface and the second flat surface; and
a plurality of fins extending out from the second flat surface of the flat plate portion that hold and support each of the layers of wires of the wire end windings against the second flat surface, wherein each layer of wire end winding is supported by two adjacent fins of the plurality of fins.

2. The rotor pole of claim 1, wherein the flat plate portion and the plurality of fins each comprise a conductive material configured to conduct heat from the wires, through the plurality of fins, and into the flat plate portion, such that the heat is dissipated by the internal cooling liquid channel in the flat plate portion.

3. The rotor pole of claim 2, wherein the conductive material comprises copper.

4. The rotor pole of claim 2, wherein the conductive material comprises aluminum.

5. The rotor pole of claim 2, wherein the conductive material comprises a ceramic.

6. The rotor pole of claim 1, wherein each of the plurality of fins is covered with a layer of an insulator coating, such that the insulator coating separates the wires from the plurality of fins.

7. The rotor pole of claim 6, wherein the insulator coating comprises a ceramic insulator coating.

8. The rotor pole of claim 1, further comprising inlet tubing and outlet tubing configured to route coolant into and out of the internal cooling liquid channel of the flat plate portion.

9. The rotor pole of claim 8, wherein the inlet tubing and outlet tubing extend to a coolant channel in a rotor hub of the generator.

10. A rotor for a liquid cooled generator, comprising:
a plurality of rotor poles mounted thereon, each of the plurality of rotor poles comprising:
a core portion that supports a plurality of layers of wire end windings;
an end winding support and heat sink disposed at each end of the core portion;
each end winding support and heat sink, comprising:
a flat plate portion having a first flat surface and an opposing second flat surface, the first flat surface being a core facing flat surface and the second flat surface being an outwardly facing flat surface,
the flat plate portion comprising an internal cooling liquid channel that routes coolant into and out of the flat plate portion, the cooling liquid channel disposed between the first flat surface and the second flat surface; and
a plurality of fins connected to and extending out from the second flat surface of the flat plate portion that hold and support each of the layers of wires of the wire end windings against the second flat surface, wherein each layer of wire end winding is supported by two adjacent fins.

11. The rotor of claim 10, wherein the flat plate portion and the plurality of fins in each end winding support and heat sink each comprise a conductive material configured to conduct heat from the wires, through the plurality of fins, and into the flat plate portion, such that the heat is dissipated by the internal cooling liquid channel in the flat plate portion.

12. The rotor of claim 10, wherein each end winding support and heat sink further comprises inlet tubing and outlet tubing configured to route coolant into and out of the internal cooling liquid channel of the flat plate portion.

13. A rotor hub of a liquid cooled generator, the rotor hub comprising a coolant channel and the rotor of claim 12, wherein the inlet tubing and outlet tubing of each of the end winding support and heat sinks extends to the coolant channel in the rotor hub.

\* \* \* \* \*